United States Patent
Lee et al.

(10) Patent No.: US 10,147,547 B2
(45) Date of Patent: Dec. 4, 2018

(54) MULTILAYER CERAMIC ELECTRONIC COMPONENT AND METHOD OF MANUFACTURING THE SAME

(71) Applicant: SAMSUNG ELECTRO-MECHANICS CO., LTD., Suwon-si, Gyeonggi-do (KR)

(72) Inventors: Eun Jung Lee, Suwon-si (KR); Hyea Sun Yun, Suwon-si (KR); Sung Ho Lee, Suwon-si (KR); Hyo Sub Kim, Suwon-si (KR)

(73) Assignee: SAMSUNG ELECTRO-MACHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/816,478

(22) Filed: Nov. 17, 2017

(65) Prior Publication Data

US 2018/0075971 A1 Mar. 15, 2018

Related U.S. Application Data (63) Continuation of application No. 14/869,938, filed on Sep. 29, 2015.

(30) Foreign Application Priority Data

Nov. 5, 2014 (KR) .......................... 10-2014-0153100

(51) Int. Cl.
*H01G 4/30* (2006.01)
*H01G 2/22* (2006.01)
*H01G 4/12* (2006.01)
*H01G 4/224* (2006.01)

(52) U.S. Cl.
CPC ................. *H01G 4/30* (2013.01); *H01G 2/22* (2013.01); *H01G 4/1209* (2013.01); *H01G 4/224* (2013.01)

(58) Field of Classification Search
CPC ....................................................... H01G 4/30
See application file for complete search history.

(56) References Cited

U.S. PATENT DOCUMENTS

| 5,659,456 A | 8/1997 | Sano et al. |
| 6,510,040 B1 * | 1/2003 | Sato ..................... H01G 4/1209 361/321.4 |
| 9,076,599 B2 | 7/2015 | Endo et al. |

(Continued)

FOREIGN PATENT DOCUMENTS

| CN | 103050282 A | 4/2013 |
| CN | 103065792 A | 4/2013 |

(Continued)

OTHER PUBLICATIONS

Office Action dated Feb. 22, 2016, in related Korean Application No. 10-2014-0153100 (English Translation provided).

(Continued)

*Primary Examiner* — Eric Thomas
(74) *Attorney, Agent, or Firm* — McDermott Will & Emery LLP (57) ABSTRACT

A multilayer ceramic electronic component includes an inner layer part comprising dielectric layers and internal electrodes that are alternately disposed; and cover parts disposed on upper and lower surfaces of the inner layer part. The cover parts contain a nickel metal.

4 Claims, 3 Drawing Sheets

(56) References Cited

U.S. PATENT DOCUMENTS

2011/0056735 A1   3/2011  Lee et al.
2013/0094118 A1   4/2013  Kim et al.
2013/0094121 A1   4/2013  Endo et al.
2013/0321979 A1  12/2013  Park et al.

FOREIGN PATENT DOCUMENTS

| | | |
|---|---|---|
| CN | 103456493 A | 12/2013 |
| JP | 06151234 | 5/1994 |
| JP | H07-263272 A | 10/1995 |
| JP | 09129493 | 5/1997 |
| JP | 2000331867 | 11/2000 |
| JP | 2006351639 A | 12/2006 |
| JP | 2013102123 A | 5/2013 |
| KR | 100145121 B1 | 4/1998 |
| KR | 10-0192563 B1 | 6/1999 |
| KR | 10-1069989 B1 | 9/2011 |

OTHER PUBLICATIONS

Non-Final Office Action issued in U.S. Appl. No. 14/869,938, dated Mar. 27, 2017.
Final Office Action issued in U.S. Appl. No. 14/869,938, dated Jul. 18, 2017.
First Office Action Action issued in Chinese Patent Application No. 201510662129.3, dated Jun. 26, 2018 (English translation).

* cited by examiner

FIG. 4

MULTILAYER CERAMIC ELECTRONIC COMPONENT AND METHOD OF MANUFACTURING THE SAME

CROSS-REFERENCE TO RELATED APPLICATION

This application is a continuation of U.S. patent application Ser. No. 14/869,938, filed on Sep. 29, 2015 which claims the benefit of priority from Korean Patent Application No. 10-2014-0153100, filed on Nov. 5, 2014, the disclosures of each are incorporated herein in their entirety by reference.

BACKGROUND

The present disclosure relates to a multilayer ceramic electronic component and a method of manufacturing the same.

In general, an electronic component made of a ceramic material, such as a capacitor, an inductor, a piezoelectric element, a varistor, a thermistor, or the like, includes a ceramic body formed of a ceramic material, internal electrodes formed within the ceramic body, and external electrodes provided on a surface of the ceramic body so as to be connected to the internal electrodes.

As various functions in fields that require high reliability are digitized and the demands thereof increase, high reliability is also required in multilayer ceramic electronic components.

Factors which impede high reliability include the generation of cracks, delamination, withstanding voltage characteristics, and the like. Also, residual carbon in a ceramic body of the multilayer ceramic electronic component may also have an influence on the reliability of the multilayer ceramic electronic component. Therefore, in order to improve reliability of the multilayer ceramic electronic component, the amount of residual carbon within the ceramic body should be decreased.

SUMMARY

One aspect of the present disclosure may provide a multilayer ceramic electronic component and a method of manufacturing the same.

According to an aspect of the present disclosure, a multilayer ceramic electronic component may comprise an inner layer part comprising dielectric layers and internal electrodes that are alternately disposed; and cover parts disposed on upper and lower surfaces of the inner layer part, wherein the cover parts contain a nickel metal.

In one embodiment, the cover parts may contain 0.18 to 19 wt % of the nickel metal, based on a total weight of the cover parts.

In another embodiment, the cover parts may contain 1.8 to 9.5 wt % of the nickel metal, based on a total weight of the cover parts.

In a cross section of a ceramic body including the inner layer part and the cover parts in a width-thickness direction, Aa/Ac may satisfy $0.2142 \leq Aa/Ac \leq 0.4911$, where Ac is an area of the ceramic body and Aa is an area in which the internal electrodes overlap.

Further, C/M may satisfy $1.826 \leq C/M \leq 4.686$, where C is a thickness of each of the cover parts, and M is a margin of the inner layer part in a width direction.

According to another aspect of the present disclosure, a method of manufacturing a multilayer ceramic electronic component may comprise steps of preparing a plurality of first green sheets using a first dielectric slurry; preparing a plurality of second green sheets using a second dielectric slurry containing nickel oxide particles; forming internal electrode patterns on the first green sheets; stacking the first and second green sheets to prepare a green sheet multilayer body; and sintering the green sheet multilayer body to prepare a ceramic body including an inner layer part in which first dielectric layers and internal electrodes are alternately disposed, and cover parts disposed on upper and lower surfaces of the inner layer part.

The cover parts may contain a nickel metal formed by reduction of the nickel oxide particles contained in the second green sheets during the sintering of the green sheet multilayer body.

In one embodiment, the second dielectric slurry may contain 0.1 to 10 wt % of the nickel oxide particles, based on a total weight of the second dielectric slurry.

In another embodiment, the second dielectric slurry may contain 1 to 5 wt % of the nickel oxide particles, based on a total weight of the second dielectric slurry.

In one embodiment, the nickel oxide particles may have a particle size of 50 nm to 200 nm.

In another embodiment, the nickel oxide particles may have a particle size of 100 nm to 150 nm.

The cover parts may contain a nickel metal formed by reduction of the nickel oxide particles contained in the second green sheets during the sintering of the green sheet multilayer body.

BRIEF DESCRIPTION OF DRAWINGS

The above and other aspects, features and advantages of the present disclosure will be more clearly understood from the following detailed description taken in conjunction with the accompanying drawings

DETAILED DESCRIPTION

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Multilayer Ceramic Electronic Component

Figure 1:
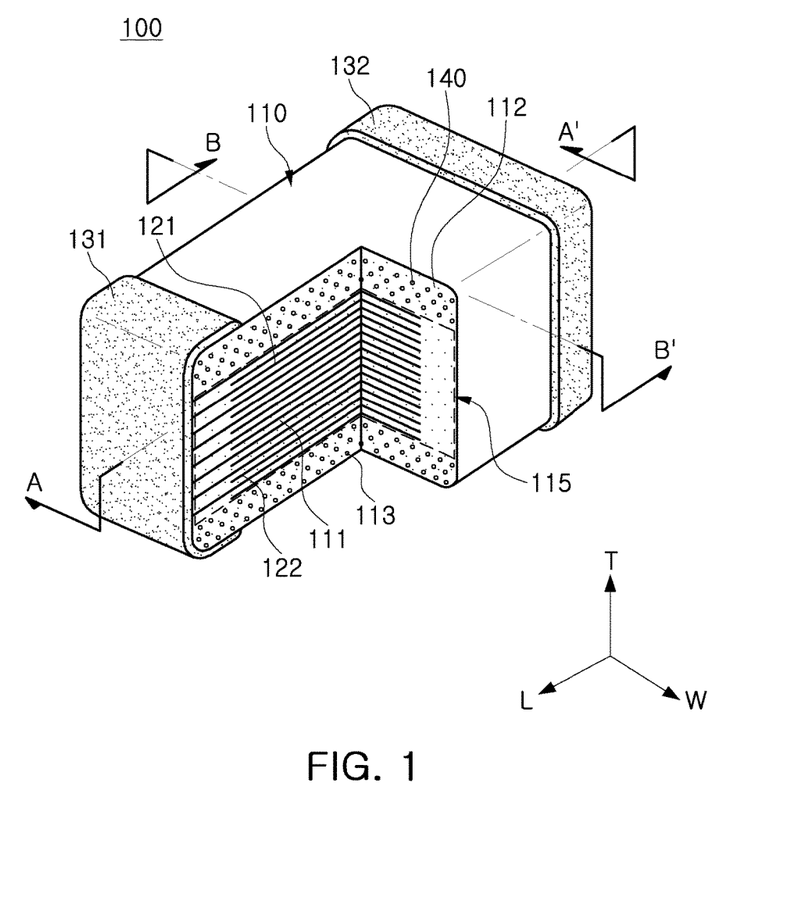
FIG. 1 is a partially cut-away perspective view schematically illustrating a multilayer ceramic electronic component according to an exemplary embodiment.
Figure 2:
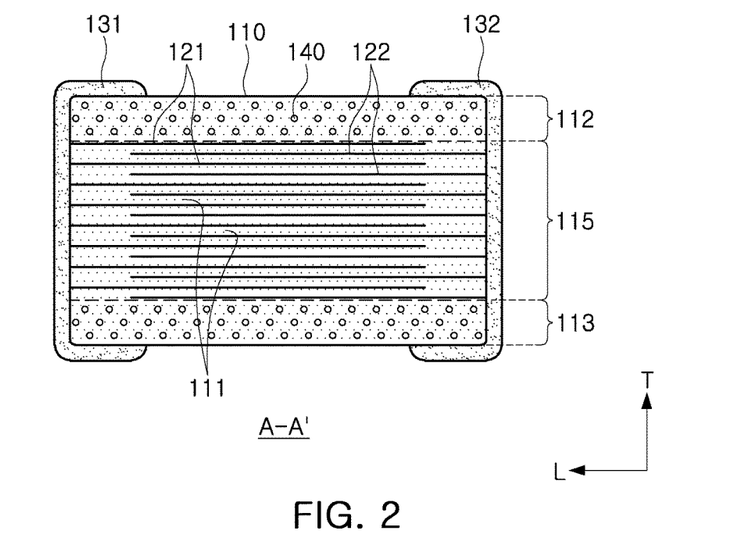
FIG. 2 is a cross-sectional view taken along line A-A' of FIG. 1.

FIG. 1 is a partially cut-away perspective view schematically illustrating a multilayer ceramic electronic component according to an exemplary embodiment, and FIG. 2 is a cross-sectional view taken along line A-A' of FIG. 1.

Referring to FIG. 1, a multilayer ceramic electronic component 100 according to an exemplary embodiment may include a ceramic body 110 and external electrodes 131 and 132.

According to the exemplary embodiment, a T-direction shown in FIGS. 1 and 2 refers to a thickness direction of the ceramic body 110, an L-direction shown in FIGS. 1 and 2 refers to a length direction of the ceramic body 110, and a W-direction shown in FIGS. 1 and 2 refers to a width direction of the ceramic body 110.

The thickness (T) direction refers to the direction in which internal electrodes and dielectric layers are stacked.

Referring to FIGS. 1 and 2, the ceramic body 110 may have upper and lower surfaces opposing each other in the thickness direction, first and second side surfaces opposing each other in the width direction, and third and fourth end surfaces opposing each other in the length direction. A shape of the ceramic body 110 is not particularly limited. For example, the ceramic body 110 may have a substantially hexahedral shape rather than a hexahedral shape having completely straight lines.

The ceramic body 110 may include an inner layer part 115 and cover parts 112 and 113.

The inner layer part 115 may include a plurality of first dielectric layers 111 and internal electrodes 121 and 122. According to the exemplary embodiment, the first dielectric layers 111 and the internal electrodes 121 and 122 may be stacked in the thickness (T) direction of the ceramic body as illustrated in FIG. 2.

According to an exemplary embodiment, the inner layer part 115 may include the first dielectric layers 111, and the cover parts may contain nickel metal particles. The nickel metal particles contained in the cover parts may be formed by reduction of nickel oxide contained in green sheets for forming cover parts. Nickel oxide contained in the green sheets for forming the cover parts may serve to supply oxygen during sintering of the ceramic body and be reduced to nickel particles to thereby be contained in the cover parts.

Hereinafter, the configuration of the multilayer ceramic electronic component will be described in more detail.

The ceramic body may include the inner layer part 115 in which a plurality of first dielectric layers 111 on which the internal electrodes 121 and 122 are disposed are stacked, and the cover parts 112 and 113 disposed on upper and lower surfaces of the inner layer part 115.

Unless specifically described, the upper and lower surfaces (or portions) of the ceramic body are not specifically defined, and may be defined as either surface of the ceramic body in the thickness direction depending on orientation of the multilayer ceramic electronic component.

The first dielectric layer 111 may contain a ceramic material having high permittivity, such as a barium titanate ($BaTiO_3$) based powder or a strontium titanate ($SrTiO_3$) based powder. However, the material of the first dielectric layer is not limited thereto as long as sufficient capacitance may be obtained.

Further, the first dielectric layer 111 may be formed of a first dielectric slurry, and if necessary, a ceramic additive, an organic solvent, a plasticizer, a binder, a dispersant, and the like, may be further added to the first dielectric slurry together with ceramic powder.

The ceramic additive may include transition metal oxides or carbides, rare earth elements, magnesium (Mg), aluminum (Al), or the like, but the ceramic additive is not limited thereto.

In this case, thicknesses of the first dielectric layers 111 may optionally be altered depending on target capacitance of the multilayer ceramic electronic component 100.

The internal electrodes may include first and second internal electrodes 121 and 122. The first and second internal electrodes 121 and 122 may be alternately disposed with at least one of the first dielectric layers 111 interposed therebetween. The first and second internal electrodes 121 and 122 may be electrically insulated from each other by the first dielectric layers 111 interposed therebetween.

The first and second internal electrodes 121 and 122, to which voltages having different polarities are applied, may be formed, for example, by printing a conductive paste containing a conductive metal on one surface of the first dielectric layers 111 at a predetermined thickness. The first internal electrode 121 may be exposed to the third end surface of the ceramic body, and the second internal electrode 122 may be exposed to the fourth end surface of the ceramic body.

The first and second internal electrodes 121 and 122 may be electrically connected to first and second external electrodes 131 and 132 through portions thereof exposed to outer surfaces of the ceramic body 110, respectively.

Therefore, when voltage is applied to the first and second external electrodes 131 and 132, electric charges may accumulate between the first and second internal electrodes 121 and 122 facing each other. In this case, capacitance of the multilayer ceramic electronic component 100 may be in proportion to an area of an overlapped region between the first and second internal electrodes 121 and 122 in the inner layer part 115.

Furthermore, the conductive metal contained in the conductive paste forming the first and second internal electrodes 121 and 122 may be nickel (Ni), copper (Cu), palladium (Pd), or an alloy thereof, but the conductive metal is not limited thereto.

The external electrodes 131 and 132 may be disposed on the third and fourth end surfaces of the ceramic body to thereby be connected to the first and second internal electrodes 121 and 122. The first external electrode 131 may be connected to the first internal electrode 121, and the second external electrode 132 may be connected to the second internal electrode 122.

The cover parts 112 and 113 may be disposed outside of the internal electrodes 121 and 122 disposed at outermost portions of the inner layer part 115. The cover parts 112 and 113 may include an upper cover part 112 disposed on an upper surface of the inner layer part 115 and a lower cover part 113 disposed on a lower surface of the inner layer part 115.

According to an exemplary embodiment, the upper and lower cover parts 112 and 113 may include second dielectric layers. According to the exemplary embodiment, one or more second dielectric layers may be included in the cover part. When the number of second dielectric layers included in the cover part is two or more, the second dielectric layers may be stacked in the thickness direction of the ceramic body. When the cover part includes two or more second dielectric layers, the plurality of second dielectric layers constituting the cover part may be in a sintered state, and adjacent second dielectric layers may be integrated with each other so that boundaries therebetween are not readily apparent.

The second dielectric layer may be formed of a second dielectric slurry, wherein the second dielectric slurry may contain the ceramic powder and nickel oxide particles, and if necessary, a ceramic additive, an organic solvent, a plasticizer, a binder, a dispersant, and the like, may be further added thereto.

The second dielectric slurry may contain 0.1 wt % to 10 wt % of nickel oxide.

The second dielectric slurry may contain 1 wt % to 5 wt % of nickel oxide.

According to an exemplary embodiment, the cover parts 112 and 113 may contain the nickel metal particles 140. The nickel metal particles contained in the cover parts 112 and 113 may be formed by reduction of the nickel oxide particles contained in the second dielectric slurry, and the cover parts may contain about 0.18 wt % to 19 wt % of the nickel metal particles 140.

The cover parts may contain about 1.8 wt % to 9.5 wt % of the nickel metal particles.

When the thicknesses of the internal electrodes 121 and 122 are decreased, a thickness of the inner layer part 115 may be decreased, but thicknesses of the cover parts 112 and 113 may be increased. For example, when the thickness of the inner layer part 115 is decreased in a ceramic body of which a width and a thickness are similar to each other, the thicknesses of the cover parts 112 and 113 may be increased in order to offset a decrease in the thickness of the inner layer part.

When the internal electrodes 121 and 122 are thinned, as an amount of the internal electrodes containing metal as a main ingredient is decreased, manufacturing costs of the multilayer ceramic electronic component may be decreased. However, if the thicknesses of the cover parts 112 and 112 are increased, a carbon ingredient that is required to be removed during the sintering of the ceramic body may not be smoothly removed, but may remain in the ceramic body 110, such that it may be difficult to remove the residual carbon.

The ceramic body 110 may be formed by sintering a green sheet multilayer body formed by stacking first green sheets on which an internal electrode paste is printed and second green sheets on which the internal electrode paste is not printed. The second green sheets may contain the nickel oxide particles.

After being sintered, the first green sheets on which the internal electrode paste is printed may form the inner layer part 115 in which the first dielectric layers 111 and the internal electrodes are alternately disposed. After being sintered, the second green sheets may form the second dielectric layers included in the cover parts 112 and 113, and the second dielectric layers may contain the nickel metal particles 140 formed by reduction of the nickel oxide particles contained in the second green sheets. The first and second green sheets may contain dielectric powder forming the ceramic body and a binder binding the dielectric powder particles, and may further contain a solvent, an additive, and the like. The binder may contain a resin composition such as an epoxy resin. The binder or other organic ingredients including carbon, which is required to be removed at the time of sintering the green sheet multilayer body, may be bonded to oxygen and externally discharged in the form of carbon dioxide ($CO_2$), or the like, to thereby be removed during the sintering.

If the organic ingredients are not removed during the sintering of the green sheet multilayer body for forming the ceramic body and the content of carbon (residual carbon) remaining in the ceramic body is high, strength of the multilayer ceramic electronic component may deteriorate. Furthermore, withstanding voltage characteristics of the multilayer ceramic electronic component may deteriorate.

During the sintering of the green sheet multilayer body, the internal electrodes in the green sheet multilayer body may serve as a main path through which oxygen is supplied to the ceramic body and organic ingredients are discharged. For example, the internal electrodes in the green sheet multilayer body may serve as a path through which oxygen is supplied into the green sheet multilayer body and as a path through which carbon bonded to oxygen is discharged in the form of carbon dioxide ($CO_2$).

However, since the internal electrodes are not disposed in the cover parts 112 and 113, the supply of oxygen and the discharge of oxidized and decomposed organic ingredients may not be smoothly performed. When the thicknesses of the cover parts 112 and 113 are increased due to a reduction in the thicknesses of the internal electrodes 121 and 122, this problem may be exacerbated.

In the multilayer ceramic electronic component, the cover parts 112 and 113 are formed of the second green sheets containing nickel oxide, and thus, even in a case in which the thicknesses of the cover parts 112 and 113 are increased, the organic ingredients in the ceramic body 110 may be efficiently removed, whereby the amount of residual carbon in the ceramic body 110 may be decreased.

During a manufacturing process of the ceramic body, the second green sheets containing the nickel oxide particles may be disposed on upper and lower surfaces of a multilayer body of the first green sheets on which internal electrode patterns are printed. Nickel oxide contained in the second green sheets may be reduced to a nickel metal and may generate oxygen during a reduction process. Oxygen generated by the reduction of nickel oxide may be bonded to the carbon ingredient in the ceramic body to thereby be discharged in the form of carbon dioxide, such that the carbon ingredient in the ceramic body may be externally discharged.

The reduction of nickel oxide and the formation of carbon dioxide may be represented by the following Chemical Formulae 1 and 2.

[Chemical Formula 1]

[Chemical Formula 2]

Therefore, when the second green sheets contain nickel oxide, the amount of residual carbon in the ceramic body may be decreased.

Further, when it is not easy to calcine and sinter the green sheet multilayer body, delamination may occur between the inner layer part and the cover parts, or cracks may occur in the ceramic body. However, according to an exemplary embodiment, the second green sheets constituting the cover parts may contain nickel oxide, and thus, it may be easy to calcine and sinter the green sheet multilayer body, thereby improving density and strength of the ceramic body.

The first green sheets may be formed by applying and drying the first dielectric slurry, and the second green sheets may be formed by applying and drying the second dielectric slurry.

According to an exemplary embodiment, the second dielectric slurry may contain about 0.1 wt % to 10 wt % of the nickel oxide particles.

When the content of the nickel oxide particles contained in the second dielectric slurry is less than 0.1 wt %, there is almost no decrease in the amount of residual carbon, and in a case in which the content thereof is more than 10 wt %, residual carbon removal efficiency may deteriorate.

Furthermore, side effects may occur due to an excessive amount of nickel particles formed by the reduction of nickel oxide.

The second dielectric slurry may contain 1 wt % to 5 wt % of the nickel oxide particles.

When the second dielectric slurry contains 0.1 wt % to 10 wt % of the nickel oxide particles, the solvent, and the like, contained in the dielectric slurry may be removed during a manufacturing process of the green sheets, such that the second green sheets may contain about 0.2 wt % to 20 wt % of the nickel oxide particles.

When the second dielectric slurry contains 1 wt % to 5 wt % of the nickel oxide particles, the second green sheets may contain about 2 wt % to 10 wt % of the nickel oxide particles.

After being sintered, the second green sheets may form the upper and lower cover parts 112 and 113. The nickel oxide particles contained in the second green sheets may be reduced to the nickel metal particles 140 to thereby be present in the upper and lower cover layers 112 and 113. When the second green sheets contain 0.2 wt % to 20 wt % of the nickel oxide particles, the upper and lower cover parts 112 and 113 may contain 0.18 wt % to 19 wt % of the nickel metal particles.

When the second green sheets contain 2 wt % to 10 wt % of the nickel oxide particles, the upper and lower cover parts 112 and 113 may contain 1.8 wt % to 9.5 wt % of the nickel metal particles.

The nickel oxide particles contained in the second dielectric slurry may have a particle size of 50 nm to 200 nm. When the particle size of the nickel oxide particles is less than 50 nm, the effect of removing the residual carbon may become insignificant due to coagulation of the powder, and when the particle size of the nickel oxide particles is more than 200 nm, the effect of removing residual carbon may become insignificant due to a decrease in specific surface area of the nickel oxide particles.

Figure 3:
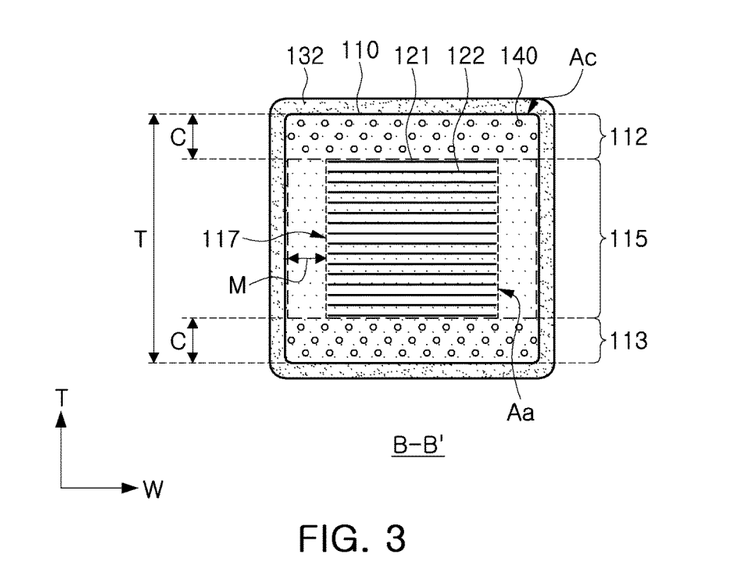
FIG. 3 is a cross-sectional view taken along line B-B' of FIG. 1.

FIG. 3 is a schematic cross-sectional view of the multilayer ceramic electronic component taken along line B-B of FIG. 1.

Referring to FIG. 3, the thickness of each of the upper and lower cover parts 112 and 113 may be defined as C, a dimension of a margin of the inner layer part 115 in the width direction may be defined as M, a cross-sectional area of the ceramic body 110 in a width-thickness direction may be defined as Ac, and a cross-sectional area of a capacitance part 117 corresponding to a region in which the internal electrodes overlap each other in the inner layer part 115 to form capacitance in the width-thickness direction may be defined as Aa.

The margin of the inner layer part 115 in the width direction is defined as a region between one end portion of the capacitance part 117 and one side surface of the ceramic body 110 in the width direction. The dimension M of the margin of the inner layer part 115 in the width direction may be defined as a distance from an end portion of an overlapped region between the first and second internal electrodes 121 and 122 to one side surface of the ceramic body 110 in the width direction.

At the time of applying power to the multilayer ceramic electronic component, acoustic noise may be generated by contraction and expansion of the inner layer part 115 due to piezoelectric characteristics of a dielectric material. In particular, in a case of a high capacitance multilayer ceramic electronic component, as the piezoelectric characteristics are increased, the generation of acoustic noise may be increased.

In general, since the intensity of acoustic noise may change depending on whether internal electrodes of a multilayer ceramic electronic component are mounted to be perpendicular to or in parallel to a circuit board, the multilayer ceramic electronic component needs to be mounted in an appropriate mounting direction, and in a case in which the multilayer ceramic electronic component is mounted incorrectly, acoustic noise may be significantly increased.

According to an exemplary embodiment, when C/M satisfies $1.826 \leq C/M \leq 4.686$ and Aa/Ac satisfies $0.2142 \leq Aa/Ac \leq 0.4911$, a difference between acoustic noise generated in a case in which the internal electrodes of the multilayer ceramic electronic component are mounted to be perpendicular to the circuit board and acoustic noise generated in a case in which the internal electrodes of the multilayer ceramic electronic component are mounted to be in parallel to the circuit board may be significantly decreased. That is, there is no significant difference between acoustic noise values in a case in which the internal electrodes of the multilayer ceramic electronic component are mounted to be perpendicular to the circuit board and in a case in which the internal electrodes of the multilayer ceramic electronic component are mounted in parallel to the circuit board.

In a case in which C/M is less than 1.826, acoustic noise may not be greatly decreased, and the acoustic noise generated in the case in which the internal electrodes of the multilayer ceramic electronic component are mounted to be in parallel to the circuit board may be significantly greater than the case in which the internal electrodes of the multilayer ceramic electronic component are mounted to be perpendicular to the circuit board.

Further, in a case in which C/M is more than 4.686, the margin of the inner layer part may be excessively narrow, leading to an increase of the probability that a cutting defect will occur during the cutting process of a multilayer body into a single electronic component.

Further, in a case in which Aa/Ac is less than 0.2142, it may be difficult to obtain target capacitance, and in a case in which Aa/Ac is more than 0.4911, a ratio between acoustic noise when the internal electrodes of the multilayer ceramic electronic component are mounted in parallel with a circuit board and acoustic noise when the internal electrodes of the multilayer ceramic electronic component are mounted perpendicularly with a circuit board may be more than 1.1, resulting in an increased difference in generation of acoustic noise.

According to an exemplary embodiment, the ceramic body of the multilayer ceramic electronic component satisfies $1.826 \leq C/M \leq 4.686$ and $0.2142 \leq Aa/Ac \leq 0.4911$, target capacitance may be secured, and a mounting directionality of the electronic component is not a concern. Therefore, a significant increase in acoustic noise due to the multilayer ceramic electronic component being mounted on a board in an incorrect direction may be prevented, and cutting defects occurring during the cutting process of the multilayer body may also be prevented.

Method of Manufacturing Multilayer Ceramic Electronic Component

Figure 4:
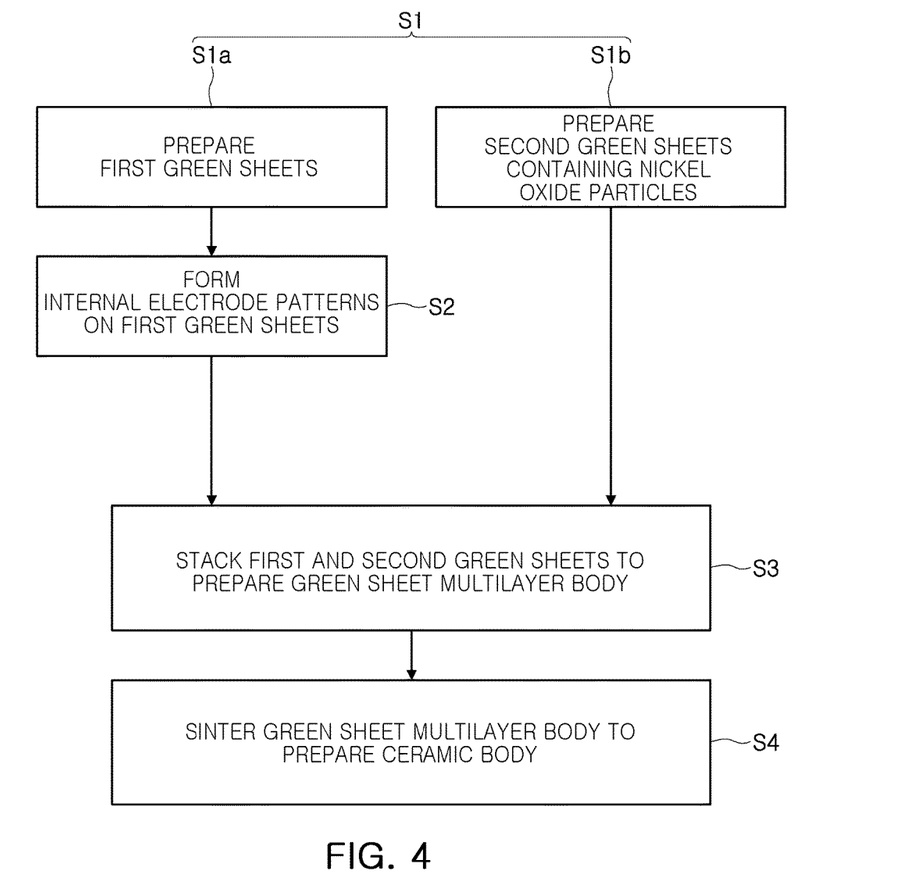
FIG. 4 is a flowchart illustrating a method of manufacturing a multilayer ceramic electronic component according to another exemplary embodiment.

FIG. 4 is a flow chart illustrating a method of manufacturing a multilayer ceramic electronic component according to another exemplary embodiment.

The method of manufacturing a multilayer ceramic electronic component according to the present exemplary embodiment may include: preparing a plurality of first green sheets (S1a); preparing a plurality of second green sheets containing nickel oxide particles (S1b); forming internal electrode patterns on the first green sheets (S2); preparing a green sheet multilayer body (S3); and preparing a ceramic body (S4).

Among descriptions of the method of manufacturing a multilayer ceramic electronic component according to the present exemplary embodiment, descriptions overlapping with those of the above-mentioned multilayer ceramic electronic component according to the previous exemplary embodiment will be omitted, and differences therebetween will mainly be described below.

The first green sheets may be used for forming an inner layer part, and the second green sheets may be used for forming cover parts. A plurality of first and second green sheets may be prepared.

The first green sheets may be formed of first dielectric slurry, and the second green sheets may be formed of second dielectric slurry.

The internal electrode patterns may be printed on the first green sheets, and the first green sheets on which the internal electrode patterns are printed may be stacked to thereby form the inner layer part.

One or more second green sheets may be stacked to thereby form the cover part.

Hereinafter, each operation will be described in detail. However, the method of manufacturing a multilayer ceramic electronic component according to the exemplary embodiment is not limited thereto.

A plurality of stripe-type first internal electrode patterns may be formed on a first green sheet, having a predetermined interval therebetween. The plurality of stripe-type first internal electrode patterns may be formed in parallel with each other.

The predetermined interval may be a distance for allowing internal electrodes to be insulated from external electrodes having a different polarity.

Further, a plurality of stripe-type second internal electrode patterns may be formed on another first green sheet, having a predetermined interval therebetween.

The first green sheets may be formed of a first dielectric slurry containing ceramic powder, an organic solvent, and an organic binder. The first dielectric slurry, if required, may further contain an additive such as a dispersant or a plasticizer.

The ceramic powder may be a material having high permittivity, and a barium titanate ($BaTiO_3$)-based material, a lead complex perovskite-based material, a strontium titanate ($SrTiO_3$)-based material, or the like, may be used, but the ceramic material is not limited thereto. Among the aforementioned materials, the barium titanate ($BaTiO_3$)-based powder may be used. The first green sheets may be sintered to thereby become dielectric layers forming a ceramic body.

The first and second internal electrode patterns may be formed of an internal electrode paste containing a conductive metal. The conductive metal may be Ni, Cu, Pd, or an alloy thereof, but is not limited thereto.

A method of forming the first and second internal electrode patterns on the first green sheets is not particularly limited. For example, a printing method such as a screen printing method or a gravure printing method may be used.

The second green sheets may be formed of second dielectric slurry containing ceramic powder, nickel oxide powder, an organic solvent, and an organic binder.

The second green sheets may be formed of a paste having the same composition as that of the first green sheets except for further containing the nickel oxide powder. However, a material of the second green sheets is not necessarily limited thereto, but if necessary, the second green sheets may be formed of a paste having a composition different from that of the first green sheets.

The second green sheets may contain 0.2 wt % to 20 wt % of the nickel oxide particles. In one exemplary embodiment, the second green sheets may contain 2 wt % to 10 wt % of the nickel oxide particles.

The nickel oxide particles contained in the second green sheets may have a particle size of 50 nm to 200 nm. In one exemplary embodiment, the nickel oxide particles may have a particle size of 100 nm to 150 nm.

Next, the first and second green sheets may be stacked so that the stripe-type first internal electrode patterns and the stripe-type second internal electrode patterns are alternately stacked and the second green sheets are disposed on upper and lower surfaces of a first green sheet multilayer body.

Then, first and second green sheet multilayer bodies may be cut into an individual electronic component size so that the first and second internal electrode patterns are exposed to a cutting surface.

Thereafter, each of the cut green sheet multilayer bodies may be sintered, thereby forming a ceramic body. The sintering of the multilayer body may be performed at 1100 to 1300° C. under an $N_2$—$H_2$ atmosphere, but is not limited thereto.

Further, external electrodes may be formed on a third end surface of the ceramic body to which first internal electrodes are exposed and a fourth end surface of the ceramic body to which second internal electrodes are exposed, respectively.

The external electrodes may be formed by applying and sintering a conductive paste on the third and fourth end surfaces of the ceramic body, but the shape of the external electrodes and a method of forming the external electrodes are not particularly limited.

Experimental Example

A second dielectric slurry containing barium titanate ($BaTiO_3$) powder, a binder, a solvent, and nickel oxide powder of 50 nm to 200 nm was prepared.

The second dielectric slurry was applied and dried on a PET film, thereby forming a second green sheet. Next, the second green sheet was delaminated from the PET film. The plurality of second green sheets were stacked at a suitable thickness, and cut, thereby forming a second green sheet multilayer body for forming each of upper and lower cover parts. The size of the second green sheet multilayer body used in the present experiment was about 2 mm×1 mm×1 mm (length×width×thickness).

Table 1 illustrates results obtained by observing images of samples 1, 2, and 3 (second green sheet multilayer bodies) prepared by adding 5 wt % of nickel oxide in the second dielectric slurry as in the above-mentioned method with the use of a scanning electron microscope (SEM). More specifically, Table 1 illustrates a ratio of the number of detected nickel oxide particles to the number of detected barium titanate particles per 42 $\mu m^2$ of a cross section of each second green sheet multilayer body.

Table 2 illustrates detected amounts of nickel oxide in samples 1 to 3 by inductively coupled plasma (ICP) spectroscopy.

TABLE 1

| | Ratio of Number of Detected Nickel Oxide Particles to Number of Detected Barium Titanate Particles (%/42 μm$^2$) |
|---|---|
| Sample 1 | 0.20 |
| Sample 2 | 0.47 |
| Sample 3 | 0.32 |

TABLE 2

| | Detected Amount (ppm) of Nickel Oxide by ICP Spectroscopy |
|---|---|
| Sample 1 | 1200 |
| Sample 2 | 5000 |
| Sample 3 | 3500 |

Table 3 illustrates amounts of residual carbon at the time of initial calcining of a green sheet multilayer body according to a comparative example in which nickel oxide was not contained, as compared with respective green sheet multilayer bodies of samples 1 to 3.

TABLE 3

| | Amount of Residual Carbon (ppm) |
|---|---|
| Comparative Example | 20000 |
| Sample 1 | 13000 |
| Sample 2 | 17000 |
| Sample 3 | 15000 |

Referring to Table 3, it can be seen that the amounts of residual carbon in samples 1 to 3 were smaller than the amount of residual carbon in the green sheet multilayer body according to the comparative example in which nickel oxide was not contained.

Table 4 illustrates weight decrease rates at the time of observing initial thermal decomposition behaviors depending on an addition amount of nickel oxide in the second dielectric slurry. In Table 4, a nickel oxide-free sample (nickel oxide: 0 wt %) was a reference sample, and a weight decrease rate of each of samples depending on the addition of nickel oxide was measured based on the nickel oxide-free sample.

TABLE 4

| Content (wt %) of Nickel Oxide | TGA Weight Decrease Rate (Based on Weight Decrease Rate in Nickel Oxide-Free Sample) |
|---|---|
| 0 | 1.000 |
| 0.5 | 1.007 |
| 1 | 1.028 |
| 5 | 1.045 |
| 10 | 1.046 |
| 20 | 1.040 |

Referring to Table 4, it can be seen that as the nickel oxide content in the second dielectric slurry was increased, the weight decrease rate in the initial thermal decomposition behavior was increased, but when the nickel oxide content in the second dielectric slurry was more than 10 wt %, residual carbon removal efficiency was decreased and the weight decrease rate was significantly decreased.

Table 5 illustrates data on a density of a ceramic body, permittivity of dielectric layers in an inner layer part, a dissipation factor, and room temperature log insulation resistance (IR) value depending on the nickel oxide content in second dielectric slurry.

A multilayer ceramic electronic component used to obtain the results illustrated in Table 5 was prepared as follows.

First dielectric slurry containing barium titanate (BaTiO3) powder, a binder, and a solvent was prepared and then applied onto a PET film, thereby forming a first green sheet.

Conversely, a second dielectric slurry containing barium titanate (BaTiO3) powder, a binder, a solvent, and nickel oxide powder of about 50 nm to 200 nm according to the nickel oxide content illustrated in Table 5 was prepared and then applied onto a PET film, thereby forming a second green sheet.

Thereafter, an internal electrode paste containing nickel (Ni) was applied onto the first green sheet.

Next, the first green sheets on which the internal electrode paste was applied were stacked to form a first green sheet multilayer body, and the second green sheets were stacked on upper and lower surfaces of the first green sheet multilayer body at suitable thicknesses, followed by cutting, thereby preparing a green sheet multilayer body for forming a ceramic body.

Subsequently, the green sheet multilayer body was subjected to a debinding process and sintering, thereby forming the ceramic body. The debinding process was performed at approximately 340° C. and 850° C. for 60 hours, and the sintering was performed at about 1150° C. under an N2-H2 atmosphere for 12 hours.

The size of the ceramic body used in the present experiment was about 2 mm×1 mm×1 mm (length×width×thickness), and the thicknesses of upper and lower cover parts were each about 30 μm.

TABLE 5

| Sample | Content (wt %) of Nickel Oxide | Density (g/cm$^3$) of Ceramic Body | Permittivity of Inner Layer Part | Dissipation Factor (%) | Room Temperature log IR |
|---|---|---|---|---|---|
| 1 | 0 | 5.89 | 1800 | 1.4 | 12.5 |
| 2 | 0.25 | 5.90 | 1900 | 1.4 | 12.6 |
| 3 | 0.5 | 5.91 | 2000 | 1.3 | 12.8 |
| 4 | 0.75 | 5.90 | 2050 | 1.3 | 12.6 |
| 5 | 1 | 5.92 | 2500 | 1.2 | 12.8 |
| 6 | 3 | 5.90 | 2400 | 1.2 | 12.8 |
| 7 | 5 | 5.93 | 3050 | 1.2 | 13.2 |
| 8 | 10 | 6.08 | 3300 | 1.2 | 13.2 |
| 9 | 15 | 6.15 | 3400 | 1.3 | 13.0 |
| 10 | 20 | 6.20 | 3500 | 1.4 | 13.0 |

Referring to Table 5, when the content of nickel oxide in the second dielectric slurry was less than 1 wt %, the dissipation factor was increased, and when the content of nickel oxide was more than 10 wt %, the dissipation factor was increased and insulation resistance was decreased.

As set forth above, according to exemplary embodiments, a multilayer ceramic electronic component in which the content of residual carbon in a ceramic body is low and a method of manufacturing the same may be provided.

While exemplary embodiments have been shown and described above, it will be apparent to those skilled in the art that modifications and variations could be made without departing from the scope of the present inventive concept as defined by the appended claims.

What is claimed is:
1. A multilayer ceramic electronic component comprising:
   an inner layer part comprising dielectric layers and internal electrodes that are alternately disposed; and
   cover parts disposed on upper and lower surfaces of the inner layer part, wherein the cover parts contain a nickel metal, and
wherein an amount of residual carbon is less than 20000 ppm with respect to a size of 2 mm×1 mm×1 mm,
wherein the cover parts contain 1.8 to 9.5 wt % of the nickel metal, based on a total weight of the cover parts.

2. The multilayer ceramic electronic component of claim 1, wherein the cover parts contain 0.18 to 19 wt % of the nickel metal, based on a total weight of the cover parts.

3. The multilayer ceramic electronic component of claim 1, wherein, in a cross section of a ceramic body including the inner layer part and the cover parts in a width-thickness direction, $0.2142 \leq Aa/Ac \leq 0.4911$, where Ac is an area of the ceramic body and Aa is an area in which the internal electrodes overlap.

4. The multilayer ceramic electronic component of claim 1, wherein $1.826 \leq C/M \leq 4.686$, where C is a thickness of each of the cover parts, and M is a margin of the inner layer part in a width direction.

* * * * *